United States Patent [19]

Macdonell et al.

[11] 4,386,185
[45] May 31, 1983

[54] PHOSPHONATES AS SILICA-TO-RUBBER COUPLING AGENTS

[75] Inventors: Gary D. Macdonell; Carl J. Stacy, both of Bartlesville, Okla.

[73] Assignee: Phillips Petroleum Company, Bartlesville, Okla.

[21] Appl. No.: 318,539

[22] Filed: Nov. 5, 1981

Related U.S. Application Data

[62] Division of Ser. No. 147,404, May 6, 1980, abandoned.

[51] Int. Cl.$^3$ ................................................ C08K 3/36
[52] U.S. Cl. .................................... 524/566; 523/216; 524/139; 524/570; 524/574; 525/341; 260/746; 260/756; 260/775
[58] Field of Search ................ 523/216; 524/139, 566, 524/571, 575, 570, 574, 565; 525/341; 260/756, 746, 775

[56] References Cited

U.S. PATENT DOCUMENTS

| | | | |
|---|---|---|---|
| 2,879,285 | 3/1959 | Birum | 260/461 |
| 2,901,458 | 8/1959 | Westfield et al. | 260/45.5 |
| 3,332,905 | 7/1967 | Teter | 260/41.5 |
| 3,711,493 | 1/1973 | George et al. | 260/502.4 R |

FOREIGN PATENT DOCUMENTS 591591  1/1960  Canada.

OTHER PUBLICATIONS

Chem. Abs. 96-122879w, Mikolajczyk et al., ACS Symp. Ser. 1981, 171 (Phosphorus Chem.) 55-8.
J. Org. Chem., 44 (17), 2967-2972 (1979).
Chemical Abstracts 47, 10463h (1953).

*Primary Examiner*—Melvyn I. Marquis
*Assistant Examiner*—Herbert J. Lilling

[57] ABSTRACT

Silica-reinforced rubber compositions are prepared employing a mercaptan-substituted phosphonate as a coupling agent. Preparation and use of the mercaptan-substituted phosphonate coupling agent is illustrated using dimethyl 3-mercaptopropylphosphonate and a butadiene/styrene emulsion polymerized copolymer reinforced with a precipitated hydrated silica.

10 Claims, No Drawings

PHOSPHONATES AS SILICA-TO-RUBBER COUPLING AGENTS

This application is a divisional application of our copending application Ser. No. 147,404, filed May 6, 1980, abandoned.

BRIEF SUMMARY OF THE INVENTION

Mercaptan-substituted phosphonate compounds have been found suitable as coupling agents for coupling or bonding silica to rubber in the production of silica-reinforced vulcanized rubber. In the composition the silica replaces carbon black and can be substituted entirely for the carbon black.

DETAILED DESCRIPTION

This invention relates to the production of silica-reinforced vulcanized rubber. In one of its aspects, it relates to the production of a silica-reinforced vulcanized rubber composition. In another of its aspects, it relates to an additive for coupling or bonding silica in a silica-reinforced vulcanizable rubber composition.

In one of its concepts, the invention provides a method for improving a silica-reinforced vulcanizable rubber composition by incorporating therein a mercaptan-substituted phosphonate. In another of its concepts, the invention provides a silica-reinforced vulcanized rubber composition which has been enhanced by the use of a mercaptan-substituted phosphonate as a silica-to-rubber coupling or bonding agent. In a further concept of the invention, it provides a method for preparing mercaptan-substituted phosphonate. In still another concept of the invention, it provides a silica-reinforced vulcanized rubber composition.

Carbon black has historically been the reinforcing agent of choice for rubber-based products such as tires and extruded and molded goods. Carbon black, which is produced by the thermal decomposition of oil and natural gases, greatly enhances mechanical strength and resistance to abrasion, and has in the past been an economically attractive approach to improving the physical properties of rubber products. However, the increasing demand for other oil or gas-derived petrochemicals combined with the decreasing supply of oil and natural gas has prompted searches for a carbon black replacement.

Reinforcing silica's higher cost and poorer performance has previously prevented it from competing with carbon black as a reinforcing filler for rubber. However, with recent and projected oil and gas price increases, and with the development of new silica manufacturing processes, amorphous and fine particle-size silicas have become available which are considered to be economically competitive with carbon black. A major effort to make reinforcing silica competitive with carbon black on a performance basis has evolved as a result of these changing economical factors. One approach has been the incorporation of reinforcing promoters, or coupling agents, into the rubber recipe to effectively bond the silica to the rubber.

It is an object of this invention to provide a silica-reinforced vulcanized rubber composition. It is another object of this invention to provide a method for producing an improved silica-reinforced vulcanizable rubber composition. A further object of the invention is to provide a new compound for coupling silica to rubber in a silica-reinforced vulcanizable rubber composition. It is still a further object of the invention to provide for compounding of a silica-reinforced vulcanizable rubber composition.

Other aspects, concepts, objects, and the several advantages of the invention are apparent from a study of this disclosure and the appended claims.

According to the present invention, there is provided a method for silica-reinforcing a rubber composition which comprises incorporating into the composition a mercaptan-substituted phosphonate coupling agent.

Also, according to the present invention, there is provided a silica-reinforced vulcanized rubber composition ultimately produced.

Further, according to the invention, there is provided a method for preparing a mercaptan-substituted phosphonate suitable as a silica-to-rubber coupling agent.

The silica is employed substantially, completely to replace all of the carbon black in one embodiment of the invention. In another embodiment of the invention, the silica replaces all but a minor proportion of the carbon black.

Although this invention deals with silica-reinforcing of rubber and the ultimate replacement of carbon black therein, it will be evident to one skilled in the art, in possession of this disclosure having studied the same, that he can determine by routine testing the amount or proportion of carbon black or other filler or ingredient which can be present in the silica-reinforced vulcanized rubber composition produced according to the invention.

The mercaptan-substituted phosphonate coupling agents useful in this invention are those materials represented by the formula

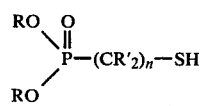

wherein R is an alkyl, cycloalkyl, aryl or arylalkyl radical having from 1 to 8 carbon atoms, R' is hydrogen or an alkyl radical of 1 to 15 carbon atoms and n is any integer from 1 to 18. Representative of these type compounds are, but not limited to, such as for example:
dimethyl mercaptomethylphosphonate
dimethyl 2-mercaptoethylphosphonate
dimethyl 3-mercaptopropylphosphonate
dimethyl 4-mercaptobutylphosphonate
dimethyl 3-mercapto-2-methylpropylphosphonate
dimethyl 3-mercaptodecylphosphonate
dimethyl 10-mercaptodecylphosphonate
dimethyl 3-mercaptotetradecylphosphonate
dimethyl 3-mercaptooctadecylphosphonate
dipropyl 3-mercaptopropylphosphonate
dicyclohexyl 3-mercaptopropylphosphonate
diphenyl 3-mercaptopropylphosphonate
dibenzyl 3-mercaptopropylphosphonate
methylbenzyl 3-mercaptopropylphosphonate
and the like.

The amount of promoter or coupling agent used in this invention can be broadly from 0.05 to 10 phr (parts by weight of coupling agent per hundred parts of rubber). It is preferred to use 0.1 to 3.0 phr.

The elastomer or rubber component of this invention can be of any type although it is preferred that the rubber be subject to a sulfur type vulcanization and as such should have some degree of unsaturation. Typical rubbers useful in this invention include natural rubber, homopolymers or copolymers of conjugated dienes, copolymers of conjugated dienes and monovinylarenes which would include emulsion and solution polymerized rubbers, terpolymers of ethylene, propylene, and a nonconjugated diolefin, butyl rubber and nitrile rubber. The polymers can by linear or branched. The conjugated dienes suitable are those which ordinarily contain 4 to about 12 carbon atoms per molecule, with those containing 4 to about 8 carbon atoms being preferred, and are exemplified by such as:

1,3-butadiene
isoprene
piperylene
2,3-dimethyl-1,3-butadiene
3-butyl-1,3-octadiene
2-phenyl-1,3-butadiene and the like. The monovinylarenes suitable are those which ordinarily contain 8 to about 16 carbon atoms per molecule, and are exemplified by:

styrene
α-methylstyrene
3-methylstyrene
4-n-propylstyrene
4-p-tolystyrene
1-vinylnaphthalene and the like.

The reinforcing fillers suitable for use in this invention include any type of silica-containing material which is considered to have reinforcing properties. These are often described as siliceous fillers and refer to fillers which are rubber compatible or can be worked into rubber mixtures, said fillers consisting of silicates or silica, or contain silicates or silica and/or contain chemically bound silicates (or silica) in the widest sense, including mixtures of two or more siliceous fillers. Suitable siliceous fillers include highly dispersed silica (silicon dioxide) having a specified surface area in the range of about 5 to 1000 $m^2/g$, preferably 20 to 400 $m^2/g$ (determined with gaseous nitrogen according to the known BET procedure) and with primary particles sizes in the range of about 5 to 500 nm (nanometer, $10^{-9}$ meters), which can be produced, for example, by precipitation from solutions of silicates, by hydrolysis and/or oxidative high temperature conversion. There can also be used flame hydrolysis of volatile silicon halides, e.g., silicon tetrachloride, or electric arc processes. These silicas can also be present as mixed oxides or oxide mixtures with oxides of the metals aluminum (alumina), magnesium (magnesium oxide), calcium (calcium oxide), barium (barium oxide), zinc (zinc oxide), zirconium (zirconium oxide), or titanium (titanium oxide).

Suitable synthetic silicates are for example, aluminum silicate or alkaline earth silicates such as magnesium, or calcium silicate with specific surface areas of about 20 to 400 $m^2/g$ and primary particle sizes of about 10 to 400 nm.

Suitable natural silicates are, for example, kaolin, wollastonite, talc and asbestos as well as natural silicas, e.g., quartz or sand.

Generally, precipitated grade silica is the preferred filler for this invention with typical commercially available examples including Hi Sil ® 233 (PPG Industries), Aerosil ® (Degussa) and Cabosil ® (Cabot Corp.).

The siliceous fillers can be added in an amount of 5 to about 150 parts per hundred parts of rubber.

Appropriate compounding ingredients which are well known in the rubber industry may also be employed in the rubbery composition of this invention. These include accelerators, vulcanizing agents, antioxidants, other fillers, processing aids and the like.

The rubbery composition formulation used in this invention is considered to be conventional (see U.S. Pat. No. 3,798,196, Examples V to VIII) and thus not critical to the successful operation of the invention. The formulation used for evaluation is shown in Recipe I.

| Recipe I | |
|---|---|
| Ingredient | Parts by Weight |
| SBR 1500[a] | 100 |
| Silica[b] | 40 |
| Zinc oxide | 4 |
| Stearic acid | 2 |
| Sulfur | 2.75 |
| Benzothiazyl disulfide[c] | 1.5 |
| Diphenyl guanidine[d] | 1.5 |
| Reinforcing promotor | 0 or 1.5 | a. Butadiene/styrene emulsion polymerized copolymer having a bound monomer ratio of 76.5/23.5.
b. A precipitated hydrated silica having 22 nm particle size sold as Hi Sil 233 (PPG Industries).
c. A cure accelerator sold as Altax ® (R. T. Vanderbilt).
d. A cure accelerator sold as DPG.

Variations in the quality of the ingredients or the substitution of other type ingredients is left to the descretion of those skilled in the art. In like manner, the method of mixing the ingredients, accomplished in any suitable mixer, and the method for curing or vulcanizing of the formulation is left to the needs and experience of those skilled in the art.

The following examples serve to illustrate the operability of this invention.

EXAMPLE I

This example is a non-inventive run describing the preparation of the intermediate compound, dimethyl 2-propenylphosphonate, also known as dimethyl allylphosphonate. Into a 500 milliliter round bottom flask equipped with a condenser, magnetic stirrer, and nitrogen inlet tube was charged 242 grams (2 moles) 3-bromo-1-propene, 124 grams (1 mole) trimethylphosphite and 0.5 grams anhydrous nickel bromide. The mixture was stirred about 16 hrs at ambient room temperature under a nitrogen atmosphere. The mixture was then refluxed with stirring for 8 hrs, cooled to room temperature and stirred for another 16 hrs. Upon distillation there was obtained 127.7 grams (95.2% wt yield) of dimethyl 2-propenylphosphonate distilling at 87°–92° C./10.5 torr (mm).

EXAMPLE II

This example is an inventive run describing the preparation of the inventive compound dimethyl 3-mercaptopropylphosphonate. To a 500 milliliter stainless steel bomb equipped with a quartz well into which was fitted a 450 watt Hanovia Lamp was charged 75 grams (0.56 moles) or dimethyl 2-propenylphosphonate and 175 grams (5.13 moles) of hydrogen sulfide. The mixture was mechanically shaken for about 8 hrs. during which time the lamp was put in an on-off cycle of 5 minutes each. The reaction was conducted some interval cooling, e.g., cooling coils. After standing overnight, the mixture was filtered and the filtrate distilled to yield 41.9 grams (44.5 wt% yield) of dimethyl 3-mercaptopropylphosphonate distilling at 112°–117° C./1.2 torr (mm). The product analyzed for $C_5H_{13}O_3SP$ is as follows:

|  | Wt. % | |
|---|---|---|
|  | Theoretical | Experimentally Found |
| Carbon | 32.60 | 32.6 |
| Hydrogen | 7.11 | 7.3 |
| Oxygen | 26.06 | 26.6 |
| Sulfur | 17.41 | 17.4 |
| Phosphorous | 16.82 | 16.6 |

EXAMPLE III

This example describes the procedure and results of testing the inventive compound in a typical silica filled rubber formulation. The following recipe was used.

|  | Parts |
|---|---|
| SBR 1500 | 100 |
| Silica (Hi Sil 233) | 40 |
| Stearic acid | 2 |
| Zinc oxide | 4 |
| Benzothiazyl disulfide | 1.5 |
| Diphenyl guanidine | 2.75 |
| Coupling agent | 1.5 |

The compounds were mixed in a 0.4× batch size on a 5.08 cm (2.0 inch) diameter roll laboratory rubber mill, using the following milling schedule:

|  | Time, mins. |
|---|---|
| Breakdown | 2 |
| Filler addition | 5 |
| Promotor addition | 2 |
| Curative addition | 2 |
| Cut and fold | 2 |
| Fold and tight pass | 3 |
| Remill | 3 |
|  | 19 | vulcanization time was 30 min. at 160° C.

Using the above procedure, three rubber compositions were prepared; one composition was a control without a coupling agent, one composition was a control with a known commercial coupling agent, Si-69 which is bis(3-triethoxysilylpropyl) tetrasulfide available from Degussa, Wessling, W. Germany and one composition was the inventive composition using the inventive additive dimethyl 3-mercaptopropylphosphonate. These results listed in Table I indicate the inventive additive has some advantages over both control compositions. For example, the inventive additive contributes to higher tensile strength, higher % resilience, and higher Mooney than the two controls. The inventive additive contributed to good elongation, dispersion, and had a

TABLE I

Effects of Coupling Agents on Performance Properties of Cured Rubber Compositions

| Properties | Control No Additive | Si-69[a] | Inventive Additive[b] |
|---|---|---|---|
| 1. Hysteresis[c], ΔT ° C. | 34.3 | 25.0 | 34.2 |
| 2. % Resilience[d] | 68 | 72.8 | 74.1 |
| 3. Min. Mooney[e] | 71 | 50 | 99 |

TABLE I-continued

Effects of Coupling Agents on Performance Properties of Cured Rubber Compositions

| Properties | Control No Additive | Si-69[a] | Inventive Additive[b] |
|---|---|---|---|
| 4. Scorch Time[e], 5 pt. rise | 14.2 | 11.2 | 3.8 |
| 5. Dispersion[f] | 4 | 5 | 5 |
| 6. 300% Modulus[g], psi | 760 | 2110 | 1220 |
| 7. Tensile Strength[g], psi | 2400 | 2920 | 3260 |
| 8. % Elongation[g] | 565 | 380 | 530 |

[a]Degussa Inc., bis(3-triethoxysilylpropyltetrasulfide.
[b]Dimethyl 3-metcaptopropylphosphonate.
[c]Determined according to ASTM D-412-75.
[d]Determined according to ASTM D-945-72.
[e]Determined according to ASTM D-1643-63 at 280° F. (138° C.), 5 pt. rise per min.
[f]Determined according to ASTM D-26-63. Samples cut. Ratings 1 (poor) to 10 (excellent).
[g]Determined according to ASTM D-412-75.

300% modulus midway between the two control compositions. The inventive additive also contributed to a lower than desired scorch time. This scorch time could be improved, however, by reducing the level of additive employed.

Reasonable variation and modification are possible within the scope of the foregoing disclosure and the appended claims to the invention the essence of which is that mercaptan-substituted phosphonates have been prepared and have been found to be suitable coupling or bonding agents for silica-reinforced vulcanizable rubber compositions and that such rubber composition has been produced.

We claim:

1. A composition comprising a vulcanizable silica-reinforced rubber and a dihydrocarbyl mercaptohydrocarbylphosphonate coupling agent.

2. A composition according to claim 1 wherein the phosphonate can be represented by the formula:

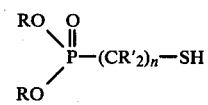

wherein R is any alkyl, cycloalkyl, aryl or arylalkyl radical having from 1 to 8 carbon atoms, R' is hydrogen or an alkyl radical of 1 to 15 carbon atoms and n is any integer from 1 to 18.

3. A composition according to claim 2 wherein the phosphonate is dimethyl 3-mercaptopropylphosphonate.

4. A composition according to claim 2 wherein the rubber is selected from the group consisting of
    natural rubber,
    homopolymers of conjugated dienes,
    copolymers of conjugated dienes, and
    terpolymers of ethylene, propylene and a nonconjugated diolefin.

5. A composition according to claim 2 wherein the rubber is a copolymer of conjugated diene and monovinylarene.

6. A composition according to claim 2 wherein the rubber is butyl rubber.

7. A composition according to claim 2 wherein the rubber is nitrile rubber.

8. A composition according to claim 4 or 5 wherein the rubber is prepared employing a conjugated diene containing 4 to about 12 carbon atoms per molecule.

9. A composition according to claim 5 wherein the conjugated diene is at least one selected from:

1,3-butadiene isoprene piperylene 2,3-dimethyl-1,3-butadiene 3-butyl-1,3-octadiene 2-phenyl-1,3-butadiene.

10. A composition according to claim 5 wherein the monovinylarene is at least one selected from:
styrene
α-methylstyrene
3-methylstyrene
4-n-propylstyrene
4-p-tolystyrene
1-vinylnaphthalene.

* * * * *